(12) United States Patent
Cheng

(10) Patent No.: US 9,924,835 B2
(45) Date of Patent: Mar. 27, 2018

(54) STOCKPOT

(71) Applicant: Chung-Yen Cheng, Taichung (TW)

(72) Inventor: Chung-Yen Cheng, Taichung (TW)

( * ) Notice: Subject to any disclaimer, the term of this patent is extended or adjusted under 35 U.S.C. 154(b) by 416 days.

(21) Appl. No.: 14/712,443

(22) Filed: May 14, 2015

(65) Prior Publication Data

US 2016/0331180 A1 Nov. 17, 2016

(51) Int. Cl.
| A47J 41/00 | (2006.01) |
| A47J 36/16 | (2006.01) |
| F24C 15/34 | (2006.01) |
| A47J 27/00 | (2006.01) |
| A47J 27/21 | (2006.01) |
| A47J 27/02 | (2006.01) |
| F24C 15/08 | (2006.01) |
| F24B 1/02 | (2006.01) |

(52) U.S. Cl.
CPC ......... *A47J 41/0055* (2013.01); *A47J 27/002* (2013.01); *A47J 27/21166* (2013.01); *A47J 36/16* (2013.01); *F24C 15/34* (2013.01); *F24B 1/022* (2013.01); *F24C 15/08* (2013.01)

(58) Field of Classification Search
CPC .................. A47J 41/0077; A47J 27/002; A47J 27/21166; A47J 36/16; F24C 15/08; F24C 15/34; F24B 1/022
USPC .... 126/400, 375.1, 27, 273.5, 274; 219/429, 219/430, 432; 220/592.26, 592.24, 220/592.23, 592.2
IPC ............ A47J 41/00,27/02, 36/16; F24C 15/08, 15/34; F24B 1/02
See application file for complete search history.

(56) References Cited

U.S. PATENT DOCUMENTS

| 93,538 | A | * | 8/1869 | Kellogg, Jr. ............ | A47J 36/36 126/27 |
| 112,164 | A | * | 2/1871 | Montague ............... | A47J 36/36 126/173 |
| 280,308 | A | * | 6/1883 | Haney ...................... | A01J 9/00 217/74 |
| 2,610,757 | A | * | 9/1952 | Irvine ................ | B65D 81/3886 220/495.03 |
| 3,766,975 | A | * | 10/1973 | Todd .................. | A47G 19/2288 126/400 |
| 4,258,695 | A | * | 3/1981 | McCarton ........... | A47J 41/0044 126/246 |
| 6,192,787 | B1 | * | 2/2001 | Montalto ............ | A47J 36/2472 219/430 |

(Continued)

FOREIGN PATENT DOCUMENTS

JP          2016168324   A   *   9/2016   .......... A47J 41/0055

*Primary Examiner* — Gregory Huson
*Assistant Examiner* — Daniel E Namay
(74) *Attorney, Agent, or Firm* — Huffman Law Group, PC

(57) ABSTRACT

A stockpot has an outer pot and an inner pot. The outer pot has an outer pot body and an insulating pot bottom. The insulating pot bottom is connected to the outer pot body and has a connecting base, a flame guiding block, and multiple insulating mounts. The flame guiding block is mounted on the connecting base. The insulating mounts are mounted on the connecting base around the flame guiding block. The inner pot is mounted in the outer pot and has an inner pot body, two handles, and an inner pot bottom. The inner pot body is mounted in the outer pot body and has an abutting ring abutting a top of the outer pot body. The handles are securely connected to the abutting ring. The inner pot bottom is securely connected to the inner pot body above the insulating pot bottom of the outer pot.

18 Claims, 12 Drawing Sheets

(56) References Cited

U.S. PATENT DOCUMENTS

| | | | | |
|---|---|---|---|---|
| 6,674,052 B1* | 1/2004 | Luo | ................. | A47J 41/0077 |
| | | | | 219/432 |
| 8,020,550 B2* | 9/2011 | Repetti, III | ............ | A47J 36/00 |
| | | | | 126/214 D |
| 9,504,357 B2* | 11/2016 | Chen | ................. | A47J 36/34 |
| 2016/0262572 A1* | 9/2016 | Cheng | ................. | A47J 36/34 |

* cited by examiner

STOCKPOT

BACKGROUND OF THE INVENTION

1. Field of the Invention

The present invention relates to a stockpot, and more particularly to a stockpot that can provide a heat insulation effect to cooked food for a prolonged time.

2. Description of Related Art

With reference to FIG. 12, a conventional stockpot 50 is used to contain water or food and is put on a heating stove 60 to cook the water or food. As a bottom of the conventional stockpot 50 is flat and cannot keep heat in the conventional stockpot 50, this will affect the heating efficiency of the conventional stockpot 50 and increase the heating time for cooking food. When the heating stove 60 is stopped from heating the conventional stockpot 50, the heat in the bottom of the conventional stockpot 50 will dissipate easily. Then, the cooked food cannot be heat-insulated in the conventional stockpot.

To overcome the shortcomings, the present invention provides a stockpot to mitigate or obviate the aforementioned problems.

SUMMARY OF THE INVENTION

The main objective of the present invention is to provide a stockpot that can provide a heat insulation effect to cooked food for a prolonged time.

The stockpot in accordance with the present invention has an outer pot and an inner pot. The outer pot has an outer pot body and an insulating pot bottom. The insulating pot bottom is connected to the outer pot body and has a connecting base, a flame guiding block, and multiple insulating mounts. The flame guiding block is mounted on the connecting base. The insulating mounts are mounted on the connecting base around the flame guiding block. The inner pot is mounted in the outer pot and has an inner pot body, two handles, and an inner pot bottom. The inner pot body is mounted in the outer pot body and has an abutting ring abutting a top of the outer pot body. The handles are securely connected to the abutting ring. The inner pot bottom is securely connected to the inner pot body above the insulating pot bottom of the outer pot.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
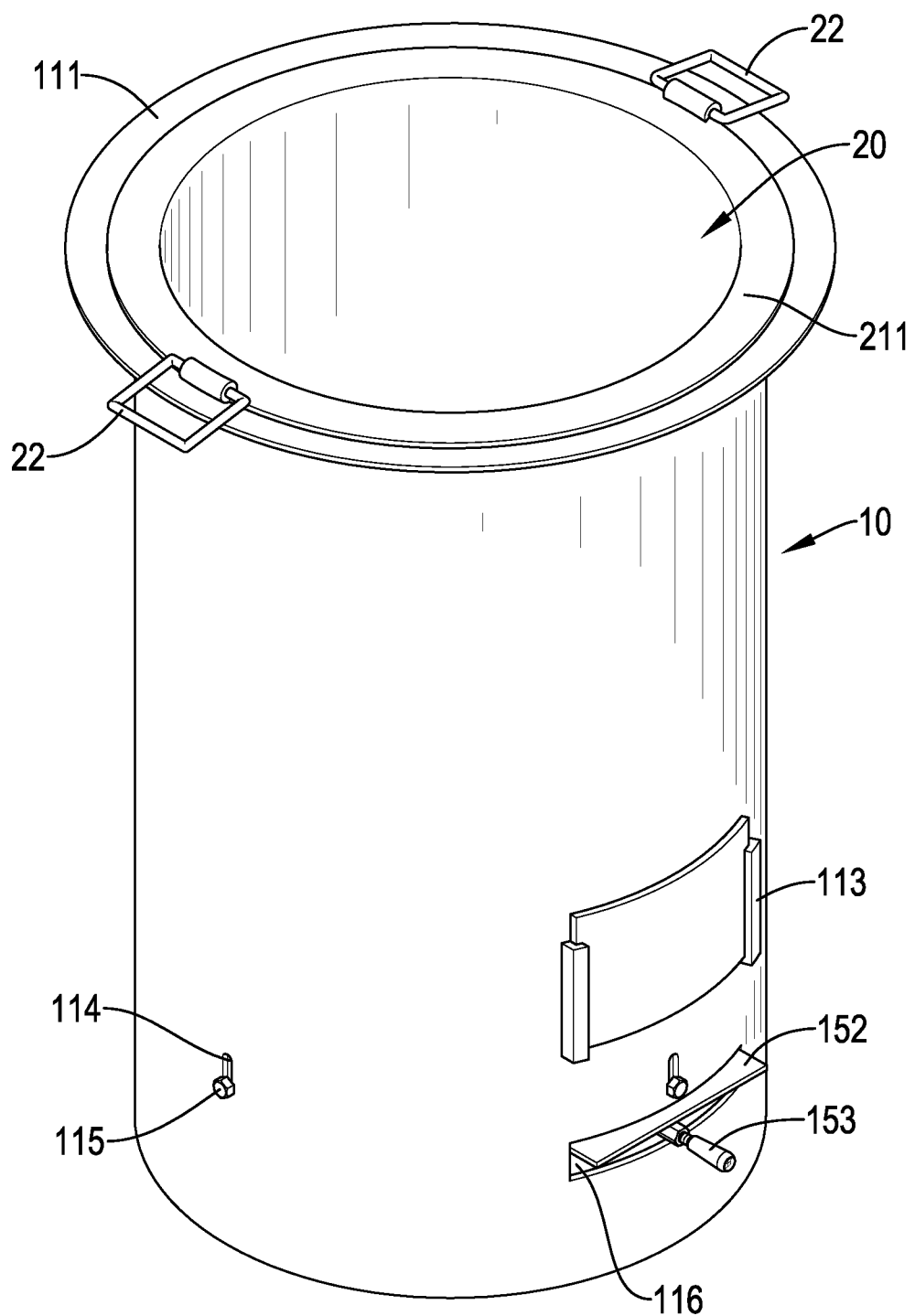
FIG. 1 is a perspective view of a first embodiment of a stockpot in accordance with the present invention.

With reference to FIGS. 1 to 4, a first embodiment of a stockpot in accordance with the present invention has an outer pot 10 and an inner pot 20.

The outer pot 10 has an outer pot body 11 and an insulating pot bottom. The outer pot body 11 is a hollow cylinder and has a top, a bottom, an external surface, an upper opening, a lower opening, a holding flange 111, multiple venting holes 112, an outer sluice gate 113, and multiple fixing holes 114. The upper opening is formed through the top of the outer pot body 11. The lower opening is formed through the bottom of the outer pot body 11 and communicates with the upper opening of the outer pot body. The holding flange 111 is annularly formed on and protrudes radially from the external surface of the outer pot body 11 around the upper opening of the outer pot body 11.

The venting holes 112 are formed through the external surface of the outer pot body 11 at intervals and are arranged horizontally. The outer sluice gate 113 is movably mounted on the external surface of the outer pot body 11 to selectively cover the venting holes 112. Preferably, the outer sluice gate 113 can be moved longitudinally relative to the outer pot body 11. The fixing holes 114 are elongated and are formed through the external surface of the outer pot body 11 at intervals around the outer pot body 11 between the outer sluice gate 113 and the lower opening of the outer pot body 11. The outer pot body 11 has multiple positioning elements 115 respectively mounted in the fixing holes 114. Preferably, each positioning element 115 is a bolt. In addition, the outer pot body 11 has an elongated hole 116 formed through the external surface of the outer pot body 11 below the outer sluice gate 113.

Figure 2:
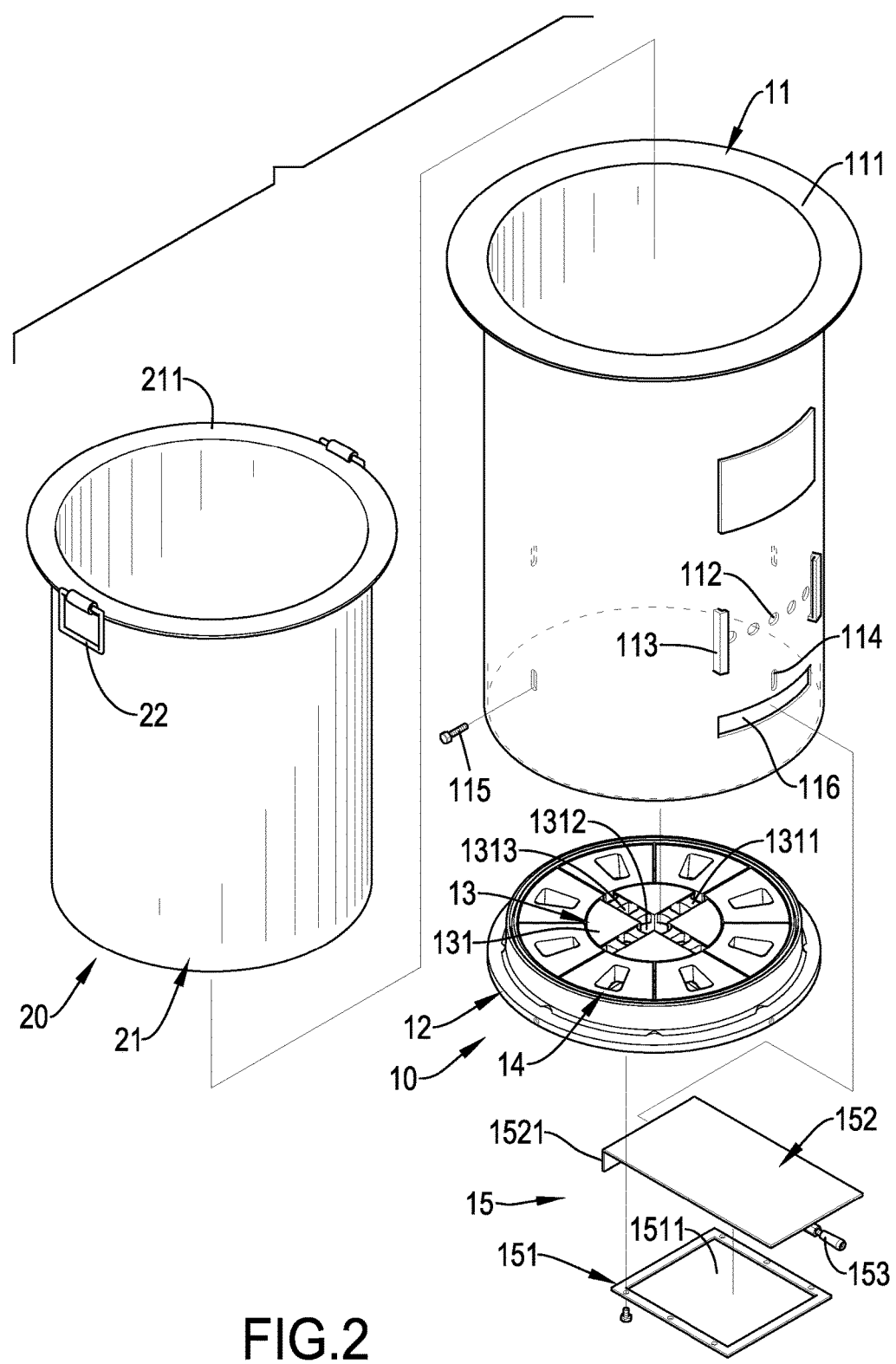
FIG. 2 is an exploded perspective view of the stockpot in FIG. 1.
Figure 3:
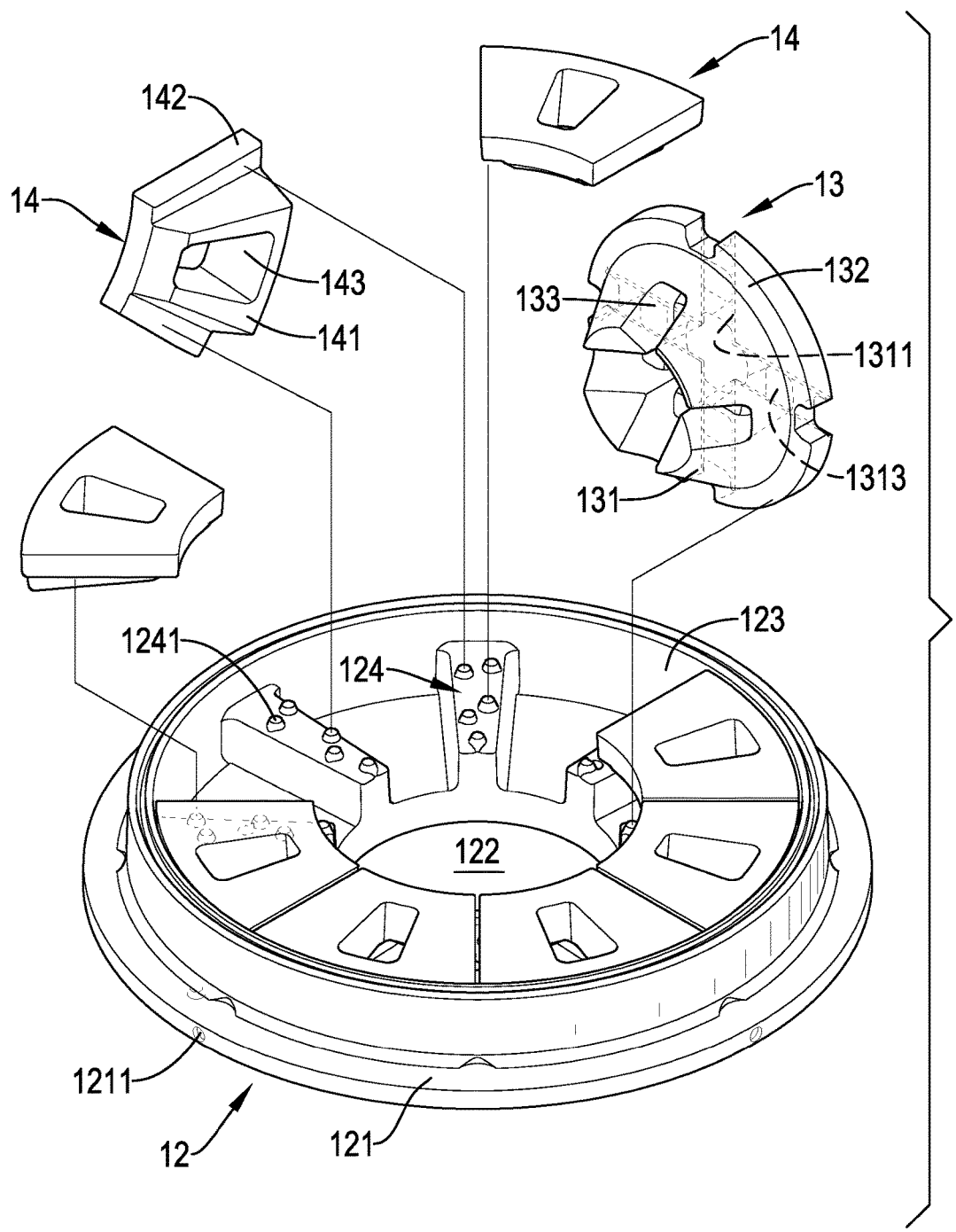
FIG. 3 is an enlarged and exploded perspective view of the stockpot in FIG. 2.
Figure 4:
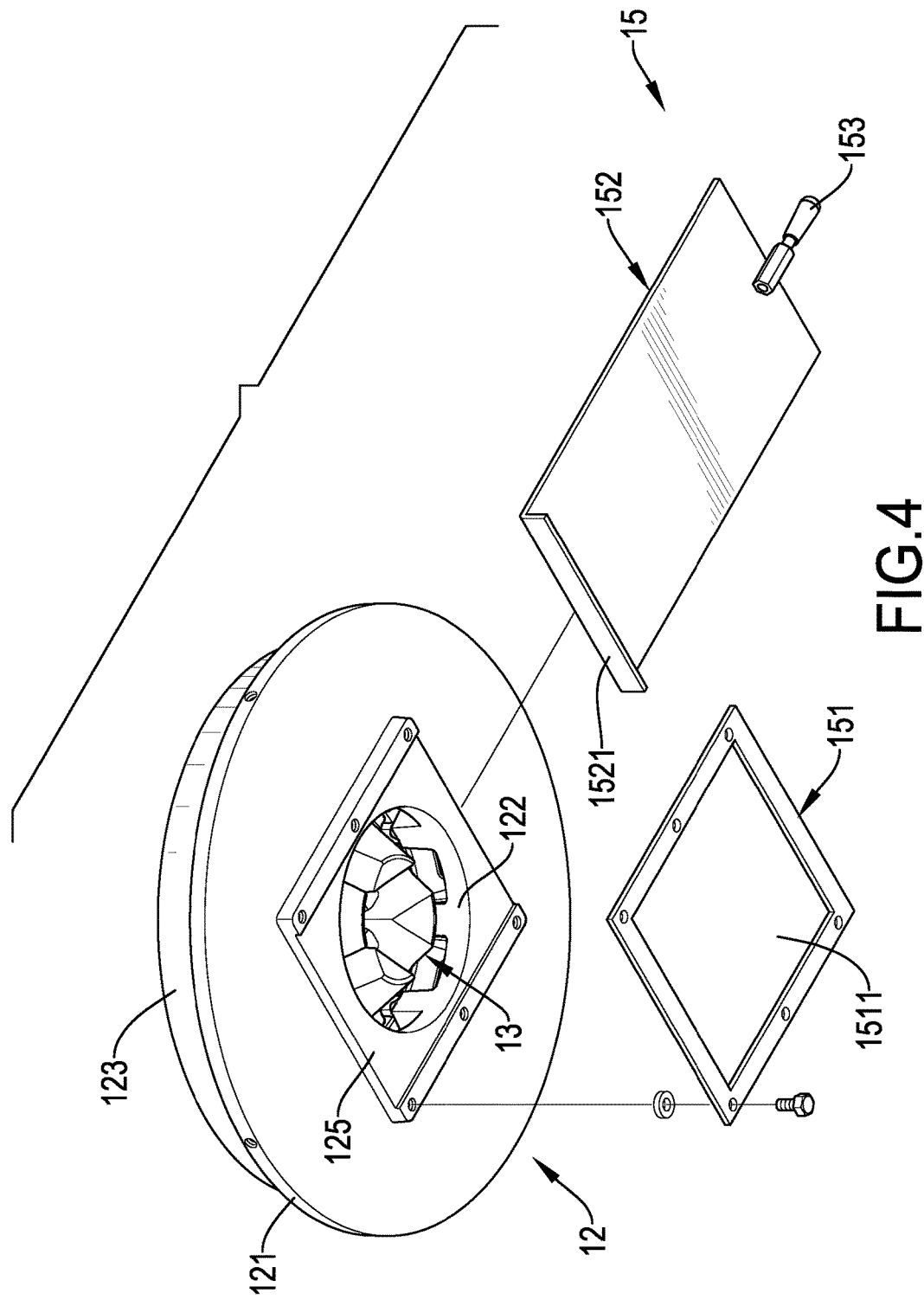
FIG. 4 is another enlarged and exploded perspective view of the stockpot in FIG. 2.

With reference to FIGS. 2 to 4, the insulating pot bottom is mounted in the outer pot body 11 near the lower opening of the outer pot body 11 and has a connecting base 12, a flame guiding block 13, multiple insulating mounts 14, and a bottom sluice gate 15.

The connecting base 12 is mounted in the outer pot body 11 and has a bottom panel 121, an inlet hole 122, an annular wall 123, multiple abutting ribs 124, and a sliding groove 125. The bottom panel 121 is round, is securely connected to the outer pot body 11, and has a center, an outer periphery, a top surface, and multiple threaded holes 1211. The threaded holes 1211 are formed in the outer periphery of the bottom panel 121 and respectively align with the fixing holes 114 of the outer pot body 11 to enable the positioning elements 115 to respectively and securely connect to the threaded holes 1211. Then, the bottom panel 121 is securely connected to the outer pot body 11. The inlet hole 122 is formed through the center of the bottom panel 121.

The annular wall 123 is formed on and protrudes upwardly from the top surface of the bottom panel 121 around the inlet hole 122 and has an inner surface and a height. The abutting ribs 124 are formed on and protrude from the top surface of the bottom panel 121 at intervals around the inlet hole 122 and are connected to the inner surface of the annular wall 123. Each abutting rib 124 is elongated and has a height, a top side, and multiple protrusions 1241. The heights of the abutting ribs 124 are lower than the height of the annular wall 123. The protrusions 1241 are formed on and protrude from the top side of the abutting rib 124 at intervals. In addition, the insulating pot bottom has eight abutting ribs 124 formed on and protrude from the top surface of the bottom panel 121 at intervals. Preferably, each abutting rib 124 has five protrusions 1241, and the five protrusions 1241 are staggered on the top side of the abutting rib 124. The sliding groove 125 is transversally formed in a bottom of the connecting base 12, communicates with the inlet hole 122, and aligns with the elongated hole 116 of the outer pot body 11.

The flame guiding block 13 is mounted in the inlet hole 122 of the connecting base 12, abuts the abutting ribs 124, and has a conducting segment 131, an abutting flange 132, and multiple notches 133. The conducting segment 131 may be tapered, is mounted in the inlet hole 122 of the connecting base 12, and has a flat top, a bottom, an external surface, a guiding slot 1311, a through hole 1312, and multiple guiding holes 1313. The guiding slot 1311 is crisscross-shaped, is formed through the flat top of the conducting segment 131, and has a center. The through hole 1312 is formed through the center of the guiding slot 1311 and communicates with the inlet hole 122. The guiding holes 1313 are formed through the conducting segment 131 and communicate with the guiding slot 1311.

The abutting flange 132 is formed on and radially protrudes from the external surface of the conducting segment 131 around the flat top of the conducting segment 131 and abuts the protrusions 1241 of the abutting ribs 124 near the inlet hole 122. The notches 133 are formed through the external surface of the conducting segment 131 at intervals and communicate with the guiding slot 1311 via the guiding holes 1313.

The insulating mounts 14 may be fan-shaped, are mounted on the connecting base 12, and abut the abutting ribs 124 around the flame guiding block 13. Each insulating mount 14 has a heating segment 141, two abutting flanges 142, and a conducting hole 143. The heating segment 141 may be fan-shaped, is mounted in the connecting base 12 between two adjacent abutting ribs 124, and has a top, a bottom, and two opposite sides. The opposite sides of the heating segment 141 respectively face the two adjacent abutting ribs 124. The abutting flanges 142 are respectively formed on and transversally protrude from the opposite sides of the heating segment 141 at the top of the heating segment 141 and respectively abut the protrusions 1241 of the two adjacent abutting ribs 124. The conducting hole 143 is formed through the top and the bottom of the heating segment 141. Preferably, the insulating pot bottom has eight insulating mounts 14 mounted on the connecting base 12 at intervals, and each insulating mount 14 abuts two adjacent abutting ribs 124.

With reference to FIGS. 1, 2 and 4, the bottom sluice gate 15 is connected to the outer pot body 11, is movably mounted through the elongated hole 116 below the connecting base 12, and has a bottom frame 151, a gate panel 152, and an operating stem 153. The bottom frame 151 is securely connected to the bottom of the connecting base 12 below the sliding groove 125 and has a gate hole 1511. The gate hole 1511 is formed through the bottom frame 151 and is disposed around the inlet hole 122 of the connecting base 12.

The gate panel 152 is movably mounted in the sliding groove 125 between the inlet hole 122 and the bottom frame 151 and has an inner edge, an outer edge, and a limiting tab 1521. The inner edge of the gate panel 152 is mounted in the sliding groove 125. The outer edge of the gate panel 152 extends out of the outer pot body 11 via the elongated hole 116 of the outer pot body 11. The limiting tab 1521 is formed on and protrudes downwardly from the inner edge of the gate panel 152 and extends in the gate hole 1511 of the bottom frame 151 to prevent the gate panel 152 separating from the bottom frame 151. The operating stem 153 is securely connected to the gate panel 152 near the outer edge of the gate panel 152 and extends out of the elongated hole 116. A user can pull or push the operating stem 153 to move the gate panel 152 to adjust an opening range of the inlet hole 122.

Figure 5:
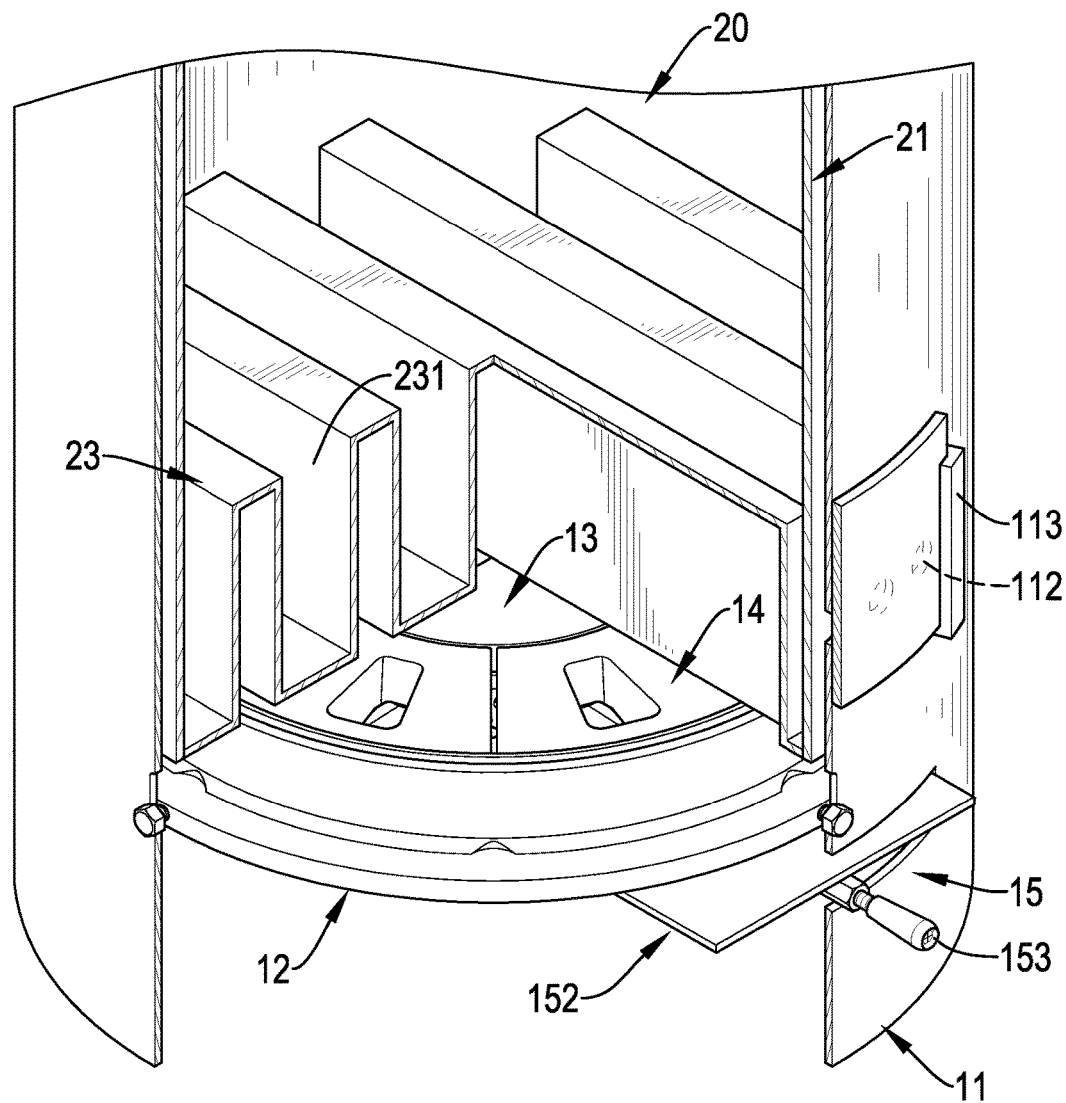
FIG. 5 is a partial cross-sectional perspective view of the stockpot in FIG. 1.
Figure 6:
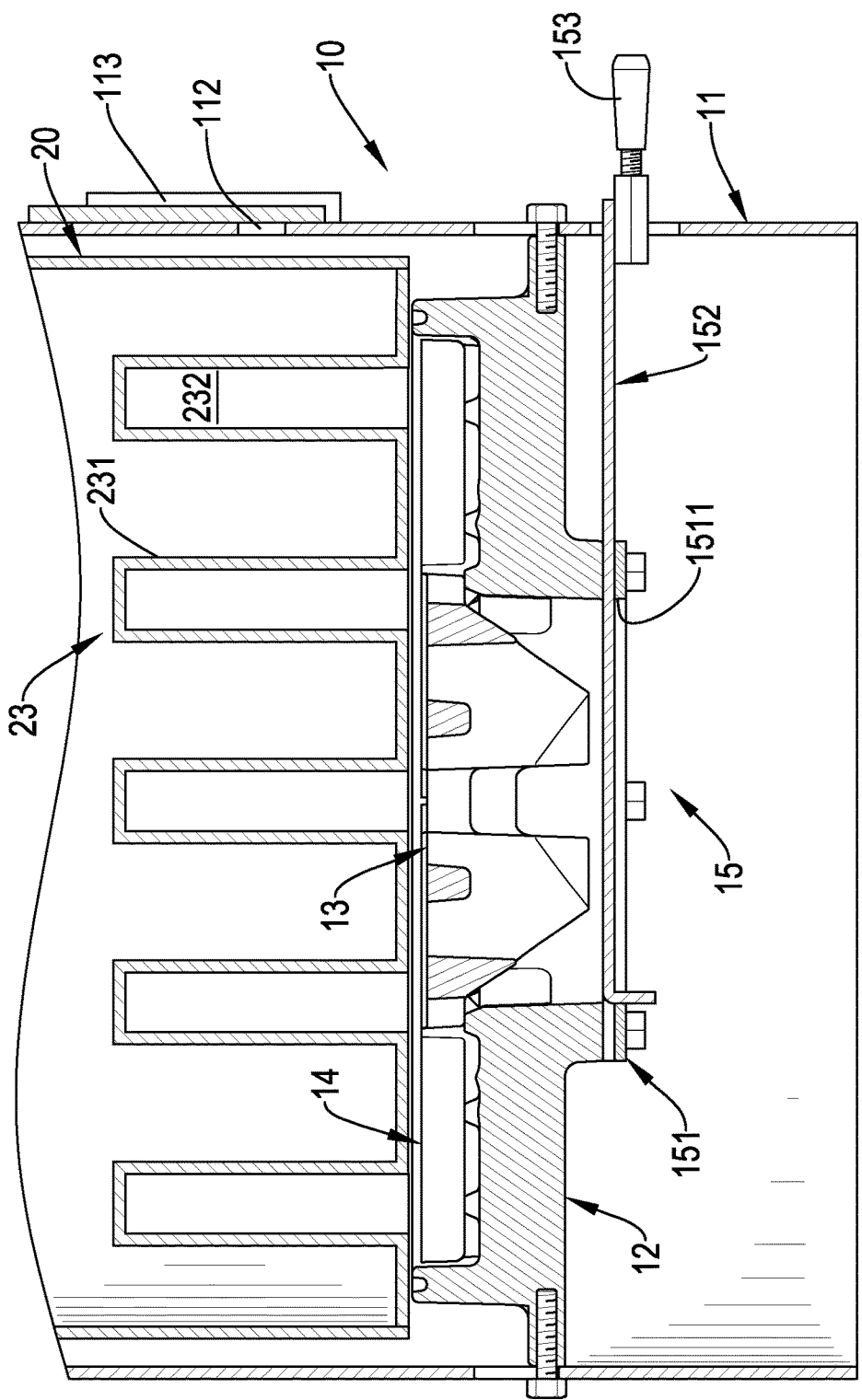
FIG. 6 is an enlarged side view of the stockpot in FIG. 1.

With reference to FIGS. 2, 5 and 6, the inner pot 20 is mounted in the outer pot 10 via the upper opening of the outer pot body 11 and has an inner pot body 21, a pair of handles 22, and an inner pot bottom 23.

The inner pot body 21 is hollow, is mounted in the outer pot body 11 above the insulating pot bottom, and has an open top, an open bottom, an external surface, and an abutting ring 211. The abutting ring 211 is radially formed on and protrudes from the external surface of the inner pot body 21 at the open top of the inner pot body 21 and abuts against the holding flange 111 of the outer pot body 11 to hold the inner pot body 21 securely with the outer pot body 11 and to form an annular gap between the pot bodies 11, 21. The pair of handles 22 is securely mounted on the abutting ring 211 of the inner pot body 21 to enable the user to move the inner pot body 21 relative to the outer pot body 11.

The inner pot bottom 23 is securely connected to the inner pot body 21 to close the open bottom of the inner pot body 21 above the insulating pot bottom of the outer pot 10. The inner pot bottom 23 has an upper side, a bottom side, multiple heating stands 231, and multiple heating spaces 232. The heating stands 231 are formed on and protrude upwardly from the upper side of the inner pot bottom 23 at intervals. Preferably, each heating stand 231 is hollow and is rectangular. The heating spaces 232 are formed in the bottom side of the inner pot bottom 23 between the heating stands 231 and communicate with the annular gap between the pot bodies 11, 21.

Figure 7:
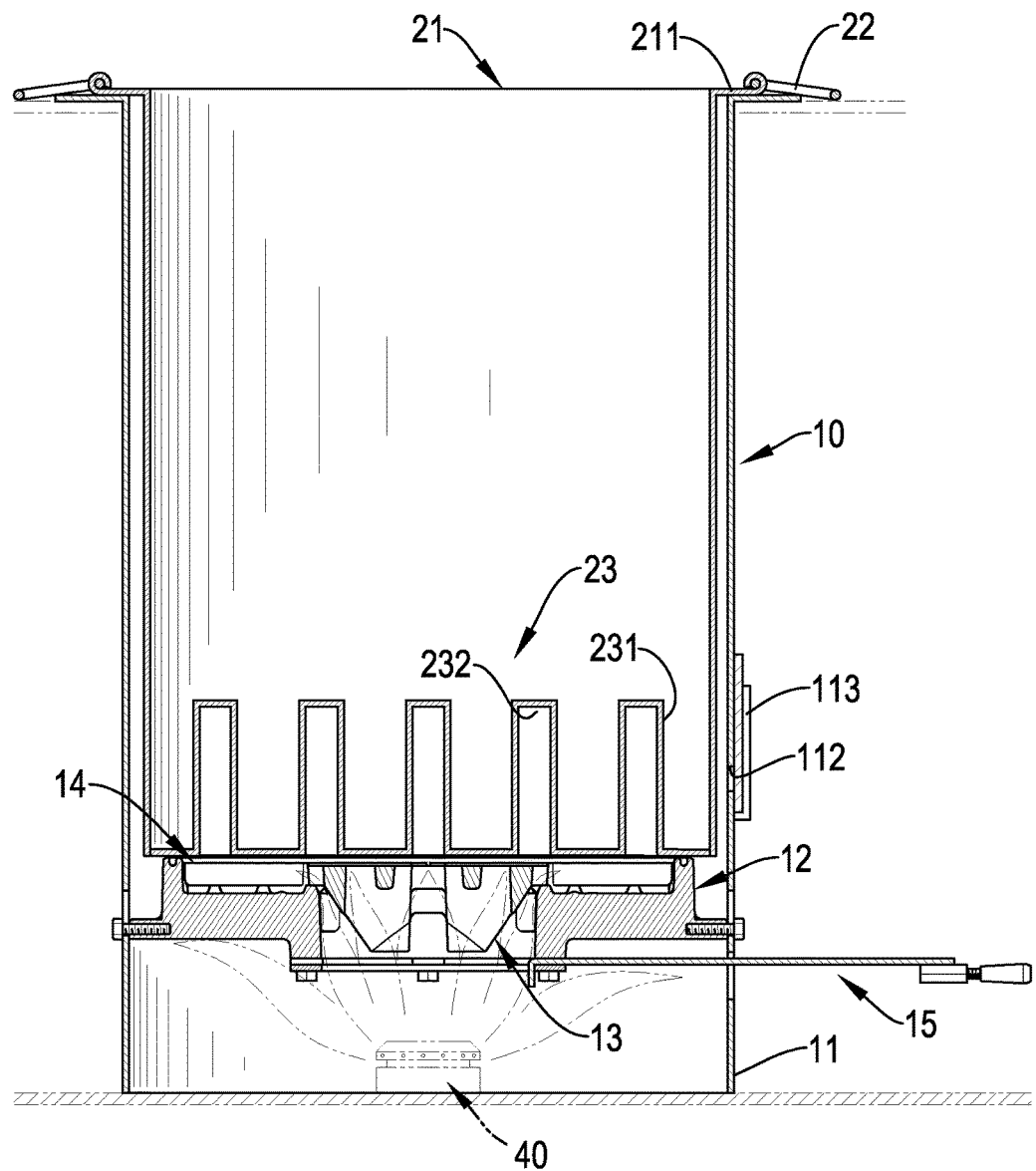
FIG. 7 is an operational side view of the stockpot in FIG. 1, placed on a heating stove.
Figure 8:
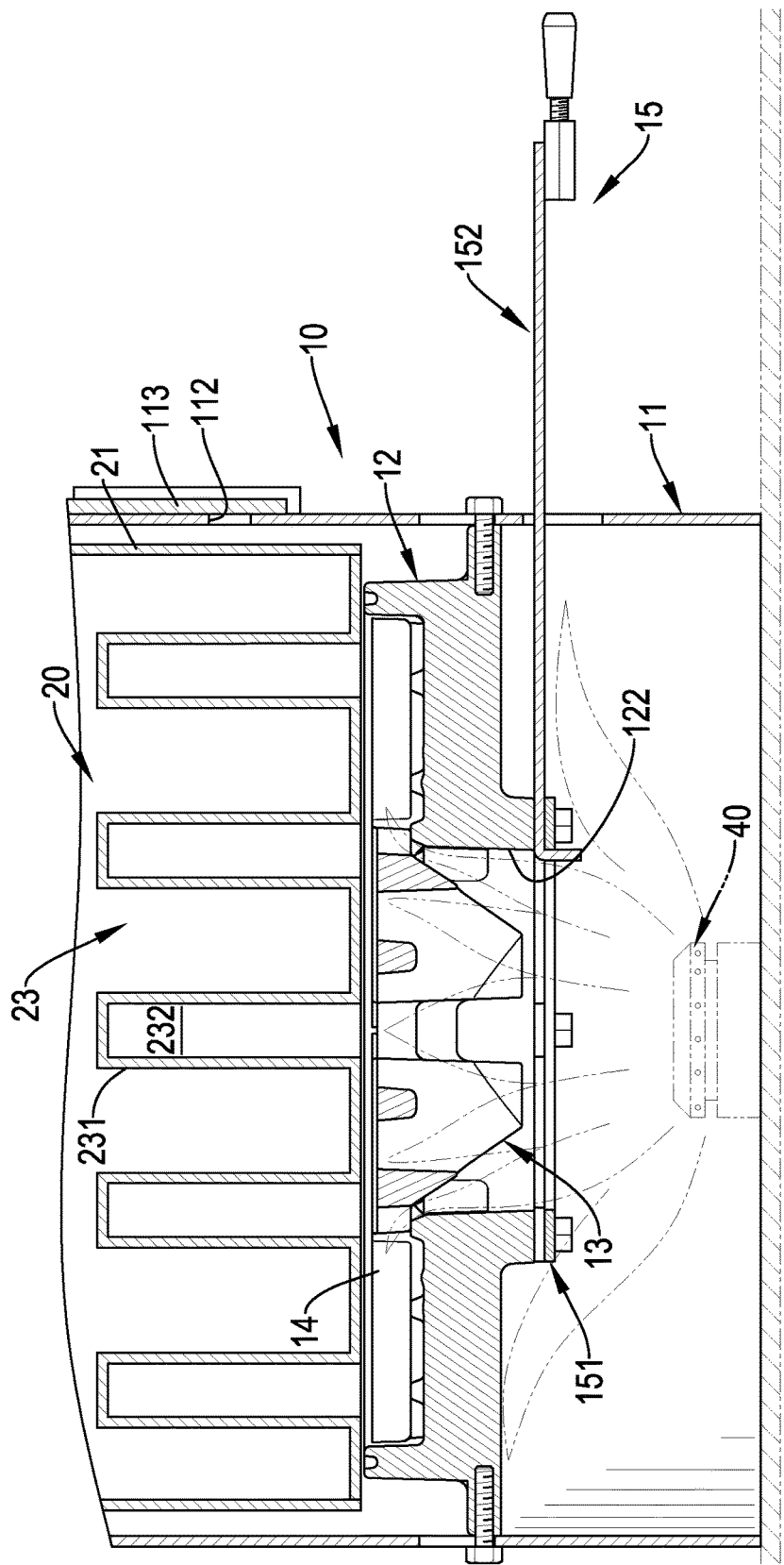
FIG. 8 is an enlarged operational side view of the stockpot in FIG. 7.

In use, with reference to FIGS. 7 and 8, food is put in the inner pot 20 and the inner pot 20 is mounted in the outer pot 10. Then, the outer pot 10 is placed on a heating stove 40 for the heating stove 40 to directly heat the insulating pot bottom of the outer pot 10. During the heating process, the flame of the heating stove 40 can heat the flame guiding block 13 via the connecting base 12 and can heat the insulating mounts 14 via the flame guiding block 13. Then, the insulating mounts 14 can be heated by the heating stove 40 to improve the heating efficiency of the heating stove 40. Furthermore, heat flow generated during the heating process can flow into the heating spaces 232 of the inner pot bottom 23 and the annular gap between the pot bodies 11, 21 to heat the inner pot 20 uniformly to cook the food.

When the heating stove 40 is turned off, the user can respectively close the venting holes 112 and the inlet hole 122 with the outer sluice gate 113 and the bottom sluice gate 15 such that the outer pot 10 is in a closed condition. The heat flow will not flow out of the outer pot 10, thereby avoiding lowering the temperature of the inner pot 20 and raising the ambient temperature. Additionally, the insulating pot bottom of the outer pot 10 has a larger volume to absorb more heat than the conventional stockpot 50. Consequently, the stockpot of the present invention can sustain a heat-insulation effect and continuously cook food for a prolonged long time even after the heating stove 40 stops heating the stockpot. In addition, because the heat cannot dissipate out of the outer pot 10 easily and the heating stove 40 only needs to heat the stockpot of the present invention once for continuous heat-insulation and cooking of the foods, the cost of using the heating stove 40 is reduced.

Figure 9:
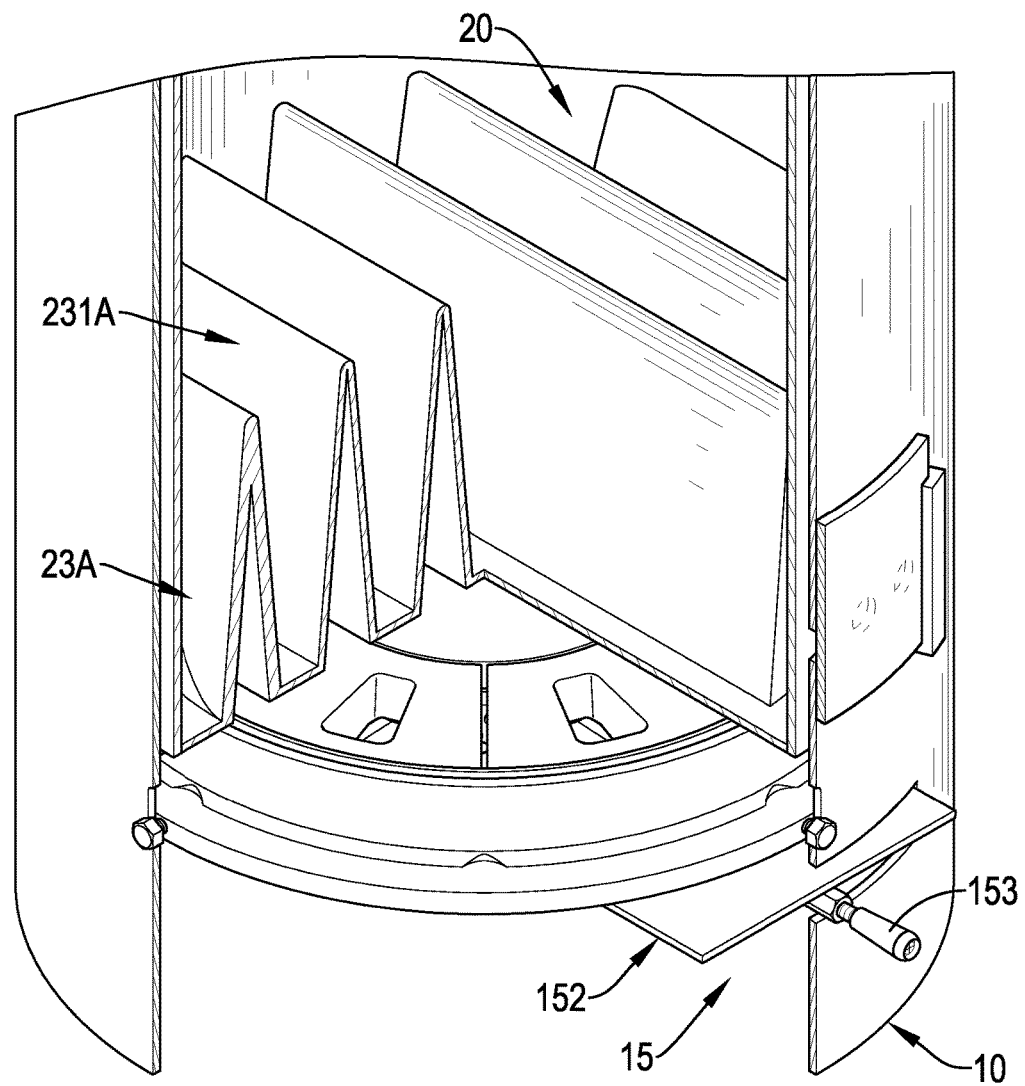
FIG. 9 is partial cross-sectional perspective view of a second embodiment of a stockpot in accordance with the present invention.

With reference to FIG. 9, a second embodiment of a stockpot in accordance with the present invention is substantially the same as the first embodiment except for the following features. Each heating stand 231A of the inner pot bottom 23A is a triangular and hollow column.

Figure 10:
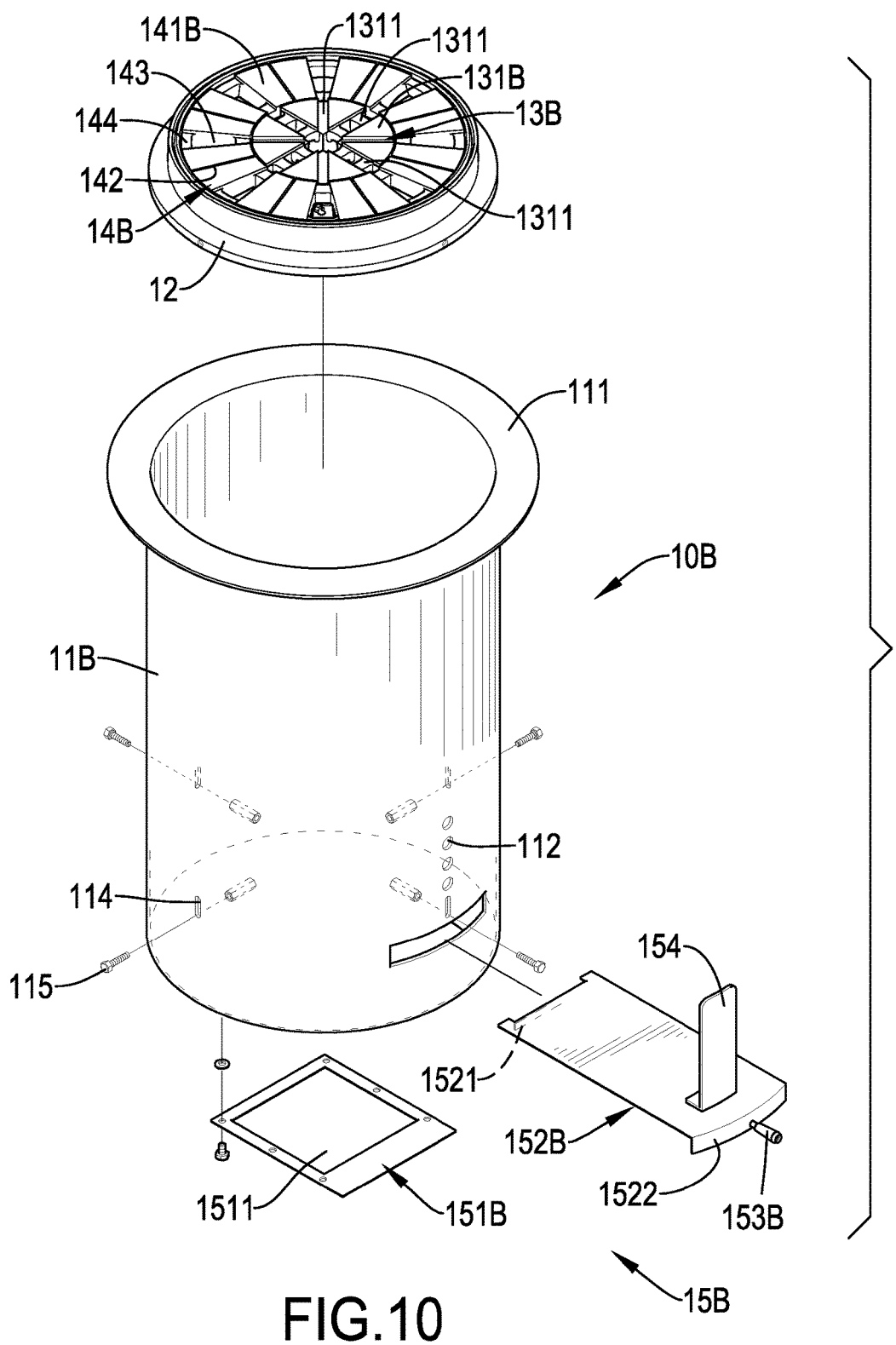
FIG. 10 is an exploded perspective view of a third embodiment of a stockpot in accordance with the present invention.
Figure 11:
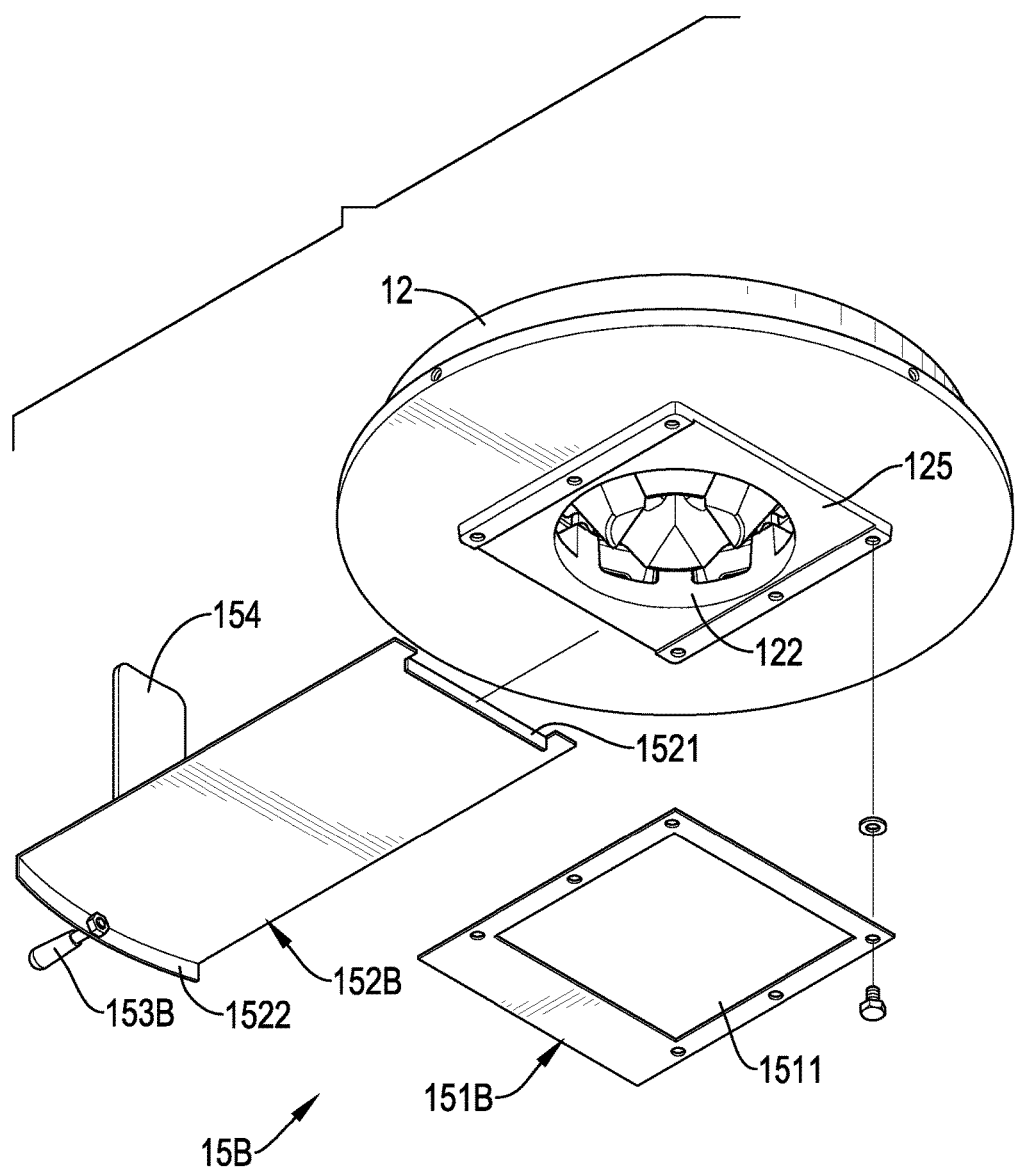
FIG. 11 is another exploded perspective view of the stockpot in FIG. 10.
Figure 12:
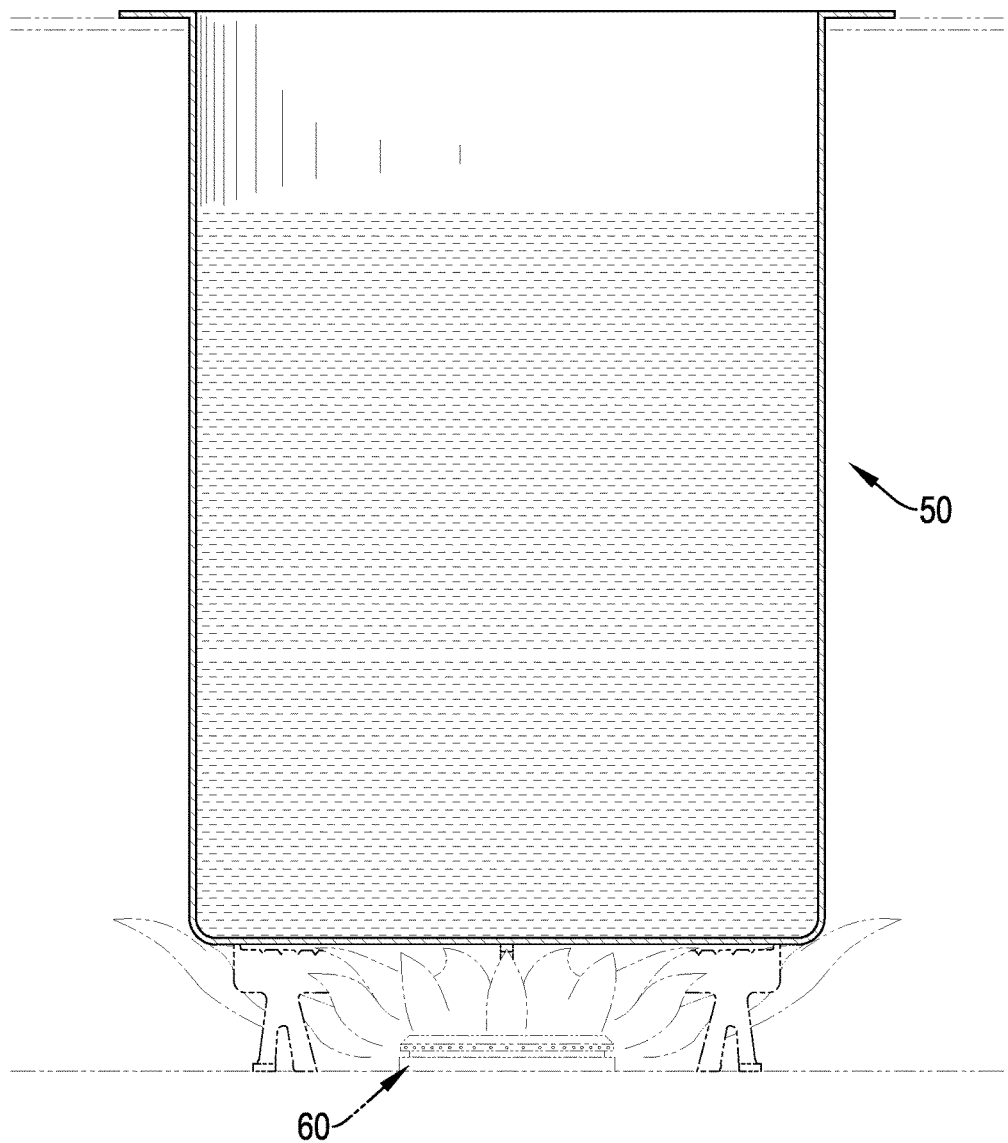
FIG. 12 is an operational side view of a stockpot in accordance with the prior art, placed on a heating stove.

With reference to FIGS. 10 and 11, a third embodiment of a stockpot in accordance with the present invention is substantially the same as the first embodiment except for the following features. The outer pot 10B does not have the outer sluice gate 113. The venting holes 112 are formed through the external surface of the outer pot body 11B of the outer pot 10B at intervals and are arranged longitudinally. Each positioning element 115 has a bolt and a nut. The bolt of the positioning element 115 is inserted into a corresponding fixing hole 114 from the external surface of the outer pot body 11B and is screwed with the nut of the positioning element 115.

Furthermore, the insulating pot bottom of the outer pot 10B is mounted in the outer pot body 11B via the upper opening of the outer pot body 11B and abuts the nuts of the positioning elements 115. The guiding slot 1311 is star-shaped and is selectively formed through the flame guiding block B, which has a conducting segment 131B. Each insulating mount 14B has a guiding groove 144 formed in the top of the heating segment 141B of the insulating mount 14B and communicates with the conducting hole 143 and the guiding slot 1311. The bottom sluice gate 15B further has a connecting tab 22, bottom frame 151B and a retaining board 154. The connecting tab 1522 is formed on and protrudes downwardly from the outer edge of the gate panel 152B, and the operating stem 153B is securely connected to the connecting tab 1522 of the bottom sluice gate 15B. The retaining board 154 is mounted on the gate panel 152B near the outer edge of the gate panel 152B to cover the venting holes 112 of the outer pot body 11B. When the gate panel 152B is moved relative to the sliding groove 125 to close the inlet hole 122, the retaining board 154 covers the venting holes 112 to close the outer pot 10B under one act of operation.

According to the above-mentioned statements, the stockpot as described has the following advantages.

1. The inner pot 20 is mounted in the outer pot 10, 10B, and the heat of the insulating pot bottom that is generated by the heating stove 40 can transfer heat to the inner pot 20 via conduction, convection or radiation to keep the inner pot 20 in a heated condition for a prolonged time. When the heating stove 40 is stopped from heating the insulting pot bottom of the outer pot 10, 10B, the insulting pot bottom can still remain at a specific high temperature, such that the heat will not easily dissipate away and can provide a continuous cooking effect to food.

2. The flame of the heating stove 40 can be guided by the flame guiding block 13, 13B and the heat can be concentrated on the insulating mounts 14, 14B to heat the inner pot 20 quickly and uniformly, and this can reduce the heating time and save the heating source.

3. The sluice gates 113, 15 can be used to close the outer pot 10, 10B into a closed condition after heating, and this can prevent the heat dissipating from the stockpot and also raising the ambient temperature.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stockpot having:
    an outer pot having
        an outer pot body having an external surface, a lower opening, and a top; and
        an insulating pot bottom mounted in the outer pot body near the lower opening and having
            a connecting base mounted in the outer pot body and having a bottom and an inlet hole formed through the connecting base;
            a flame guiding block mounted in the connecting base; and
            multiple insulating mounts mounted on the connecting base around the flame guiding block; and
    an inner pot mounted in the outer pot and having
        an inner pot body mounted in the outer pot body above the insulating pot bottom and having
            an open top;
            an open bottom;
            an external surface; and
            an abutting ring radially formed on and protruding from the external surface of the inner pot body at the open top of the inner pot body and abutting against the top of the outer pot body to hold the inner pot body securely with the outer pot body and to form an annular gap between the pot bodies;
        two handles securely mounted on the abutting ring of the inner pot body; and
        an inner pot bottom securely connected to the inner pot body to close the open bottom of the inner pot body above the insulating pot bottom of the outer pot.

2. The stockpot as claimed in claim 1, wherein the connecting base has
    a bottom panel securely connected to the outer pot body and having a top surface;
    an annular wall formed on and protruding upwardly from the top surface of the bottom panel; and
    multiple abutting ribs formed on and protruding from the top surface of the bottom panel at intervals in the annular wall;
    the flame guiding block abuts the abutting ribs of the connecting base; and
    the insulating mounts abut the abutting ribs around the flame guiding block.

3. The stockpot as claimed in claim 2, wherein each abutting rib has
    a top side; and
    multiple protrusions formed on and protruding from the top side of the abutting rib at intervals; and
    the flame guiding block has
        a conducting segment mounted in the inlet hole of the connecting base and having an external surface;

an abutting flange formed on and radially protruding from the external surface of the conducting segment and abutting the protrusions of the abutting ribs near the inlet hole; and multiple notches formed through the external surface of the conducting segment at intervals.

4. The stockpot as claimed in claim 3, wherein the conducting segment has a flat top;
a bottom;
a guiding slot being crisscross-shaped, formed through the flat top of the conducting segment, and having a center;
a through hole formed through the center of the guiding slot and communicating with the inlet hole; and
multiple guiding holes formed through the conducting segment and communicating with the guiding slot and the notches.

5. The stockpot as claimed in claim 4, wherein each insulating mount has a heating segment mounted in the connecting base between two adjacent abutting ribs and having
a top;
a bottom; and
two opposite sides respectively facing the two adjacent abutting ribs;
at least one abutting flange formed on and transversally protruding from one of the opposite sides of the heating segment and abutting the protrusions of one of the two adjacent abutting ribs; and
a conducting hole formed through the top and the bottom of the heating segment.

6. The stockpot as claimed in claim 3, wherein the conducting segment has a flat top;
a bottom;
a guiding slot being star-shaped, formed through the flat top of the conducting segment, and having a center;
a through hole formed through the center of the guiding slot and communicating with the inlet hole; and
multiple guiding holes formed through the conducting segment and communicating with the guiding slot and the notches.

7. The stockpot as claimed in claim 6, wherein each insulating mount has a heating segment mounted in the connecting base between two adjacent abutting ribs and having
a top;
a bottom; and
two opposite sides respectively facing the two adjacent abutting ribs;
at least one abutting flange formed on and transversally protruding from one of the opposite sides of the heating segment and abutting the protrusions of one of the two adjacent abutting ribs; and
a conducting hole formed through the top and the bottom of the heating segment.

8. The stockpot as claimed in claim 7, wherein each insulating mount has a guiding groove formed in the top of the heating segment of the insulating mount and communicating with the conducting hole and the guiding slot.

9. The stockpot as claimed in claim 3, wherein each insulating mount has a heating segment mounted in the connecting base between two adjacent abutting ribs and having
a top;
a bottom; and
two opposite sides respectively facing the two adjacent abutting ribs;
at least one abutting flange formed on and transversally protruding from one of the opposite sides of the heating segment and abutting the protrusions of one of the two adjacent abutting ribs; and
a conducting hole formed through the top and the bottom of the heating segment.

10. The stockpot as claimed in claim 1, wherein the insulating pot bottom of the outer pot has a bottom sluice gate movably mounted below the bottom of the connecting base to selectively close the inlet hole of the connecting base.

11. The stockpot as claimed in claim 10, wherein the outer pot body has an elongated hole formed through the external surface of the outer pot body; and
the bottom sluice gate has
a bottom frame securely connected to the bottom of the connecting base;
a gate panel movably mounted between the inlet hole and the bottom frame and extending out of the outer pot body via the elongated hole; and
an operating stem securely connected to the gate panel and extending out of the elongated hole of the outer pot body.

12. The stockpot as claimed in claim 11, wherein the bottom frame has a gate hole formed through the bottom frame and disposed around the inlet hole of the connecting base; and
the gate panel has
an inner edge mounted between the connecting base and the bottom frame;
an outer edge extending out of the outer pot body via the elongated hole of the outer pot body; and
a limiting tab formed on and protruding downwardly from the inner edge of the gate panel and extending in the gate hole of the bottom frame.

13. The stockpot as claimed in claim 12, wherein the outer pot body has multiple venting holes formed through the external surface of the outer pot body at intervals; and
the bottom sluice gate has a retaining board mounted on the gate panel near the outer edge of the gate panel to cover the venting holes of the outer pot body.

14. The stockpot as claimed in claim 13, wherein the inner pot bottom has an upper side; and
multiple heating stands being hollow, being rectangular, and formed on and protruding upwardly from the upper side of the inner pot bottom at intervals.

15. The stockpot as claimed in claim 13, wherein the inner pot bottom has an upper side; and
multiple heating stands being hollow, being triangular, and formed on and protruding upwardly from the upper side of the inner pot bottom at intervals.

16. The stockpot as claimed in claim 10, wherein the outer pot body has multiple venting holes formed through the external surface of the outer pot body at intervals; and
an outer sluice gate movably mounted on the external surface of the outer pot body to selectively cover the venting holes.

17. The stockpot as claimed in claim 1, wherein the inner pot bottom has
   an upper side; and
   multiple heating stands being hollow, being rectangular, and formed on and protruding upwardly from the upper side of the inner pot bottom at intervals.

18. The stockpot as claimed in claim 1, wherein the inner pot bottom has
   an upper side; and
   multiple heating stands being hollow, being triangular, and formed on and protruding upwardly from the upper side of the inner pot bottom at intervals.

* * * * *